United States Patent [19]

Anderson et al.

[11] Patent Number: 5,337,886
[45] Date of Patent: Aug. 16, 1994

[54] CHAIN WITH SELF ALIGNING FLIGHT SUPPORT LINKS

[75] Inventors: Roy C. Anderson, Shorewood; James W. Leege, Greendale, both of Wis.

[73] Assignee: Rexnord Corporation, Milwaukee, Wis.

[21] Appl. No.: 72,479

[22] Filed: Jun. 4, 1993

[51] Int. Cl.$^5$ .............................................. B65G 19/00
[52] U.S. Cl. ................................... 198/728; 198/732; 210/523
[58] Field of Search ............... 198/717, 728, 731, 732; 210/523, 525, 526

[56] References Cited

U.S. PATENT DOCUMENTS

| | | | |
|---|---|---|---|
| 474,975 | 5/1892 | Selleck | 198/732 X |
| 1,484,972 | 2/1924 | Sipple | 198/728 |
| 2,182,443 | 12/1939 | McAninch | 198/728 X |
| 2,409,318 | 10/1946 | Sivyer | 198/732 |
| 3,313,422 | 4/1967 | Swenson | 210/523 |
| 3,522,875 | 8/1970 | Smerd et al. | 198/728 |
| 3,646,752 | 3/1972 | Kampfer | 59/78 |
| 3,742,863 | 7/1973 | Rosenberger, Jr. | 198/728 X |
| 5,030,175 | 7/1991 | Schwengel | 474/214 |
| 5,165,522 | 11/1992 | Uttke et al. | 198/716 |

Primary Examiner—James R. Bidwell
Attorney, Agent, or Firm—Michael, Best & Friedrich

[57] ABSTRACT

A chain having a plurality of block links each including longitudinally spaced apart ends each of which has a pivot pin receiving first bore therethrough of a first diameter. The chain also has a plurality of connecting links each including longitudinally spaced pivot pins mounted in the block link first bores for articulatively interconnecting the ends of adjacent block links. The pivot pins have a close tolerance fit in the first bores to form a chain that extends along a straight line of travel. The chain further has at least one flight attachment link having a flight attachment support and longitudinally spaced leading and trailing ends pivotally connected between adjacent connecting links of the chain. The leading and trailing ends of the flight attachment link each have a second pivot pin receiving bore of a second diameter sufficiently larger than the pivot pin on which it is mounted to allow only the flight attachment link or links in the chain to cant relative to the chain straight line of travel for automatic self alignment in response to force moments on the flight attachment link to minimize torsional stress imposed on the flight attachment link and its flight attachment support.

9 Claims, 2 Drawing Sheets

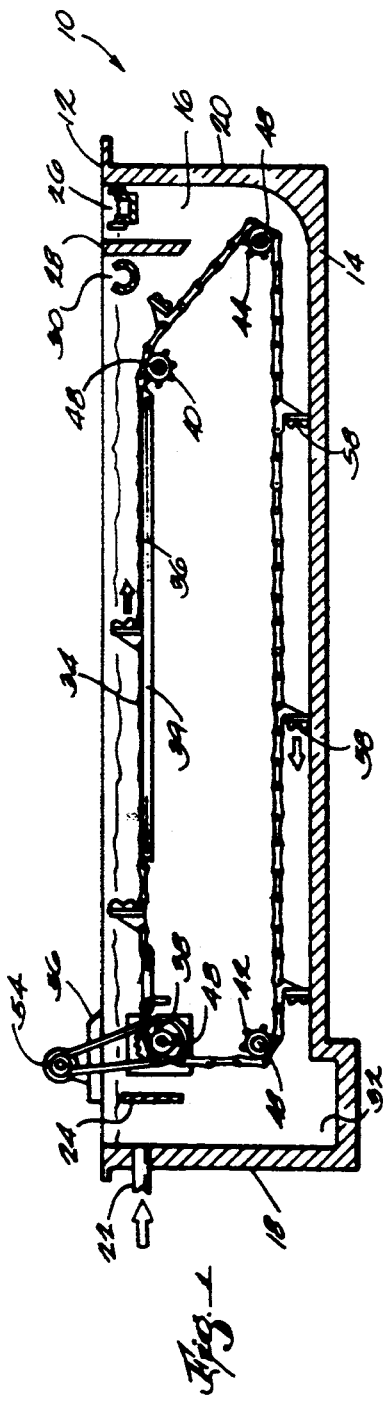
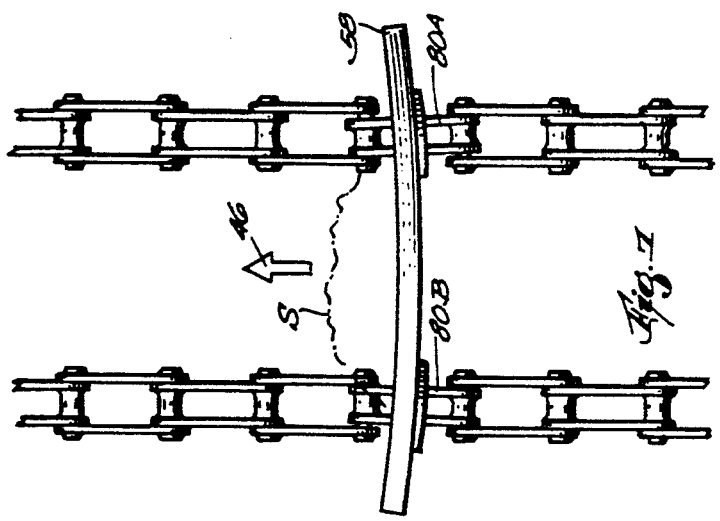
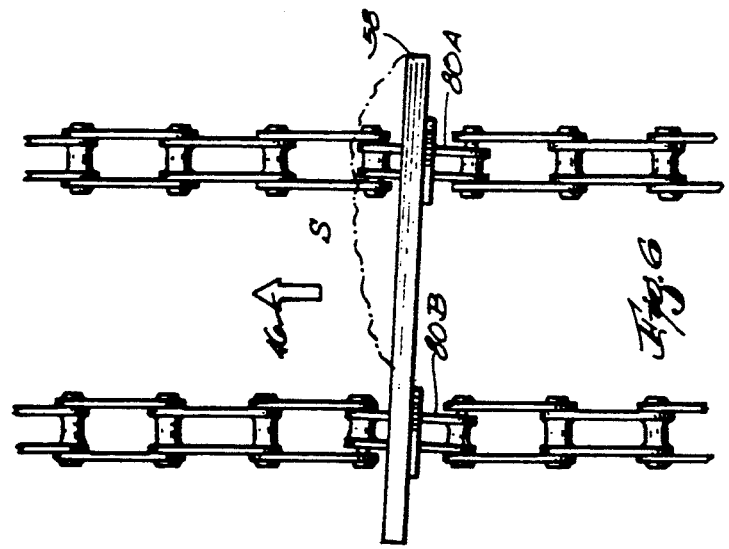
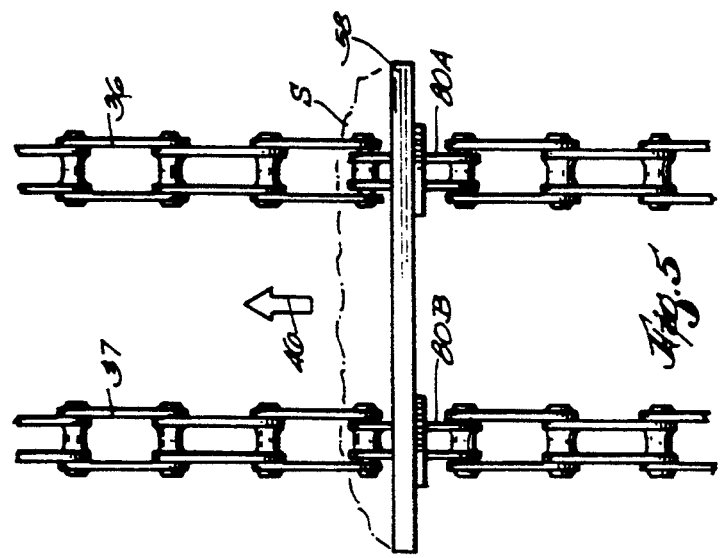

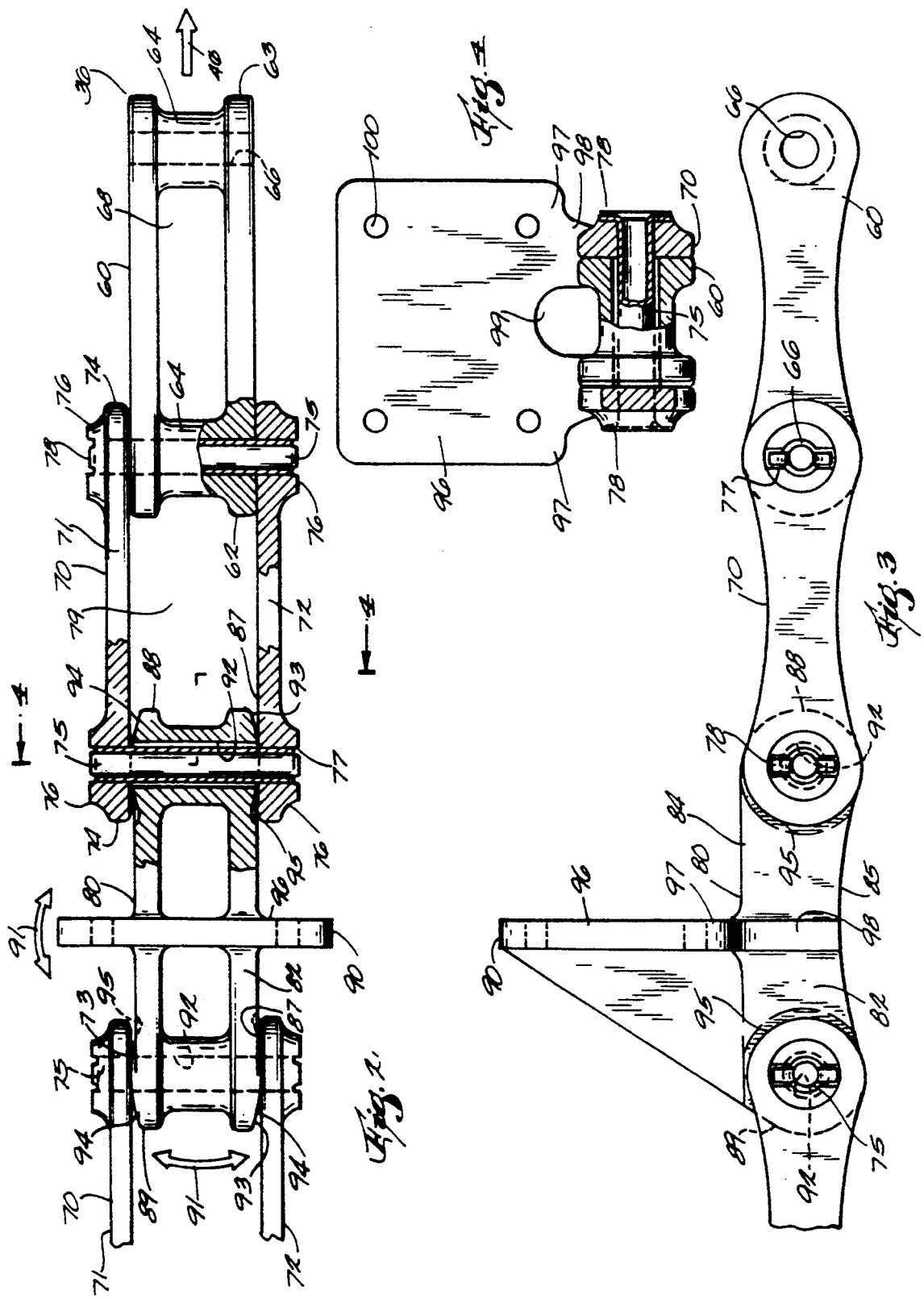

CHAIN WITH SELF ALIGNING FLIGHT SUPPORT LINKS

BACKGROUND OF THE INVENTION

1. Field of the Invention

The present invention relates generally to chains used in wastewater treatment plants that produce sludge and scum and more particularly to flight attachment links in such chains on which sludge and scum collector flights are mounted.

2. Reference to Prior Art

Wastewater treatment plants and refineries include liquid wastewater treatment tanks that use sludge and scum collector apparatus to scrape settled sludge from the bottom of the tank and to skim floating scum from the surface of the liquid wastewater. These wastewater treatment tanks may be over 300 feet long and can have widths greater than 20 feet. The collector apparatus in such tanks normally includes a pair of laterally spaced apart parallel endless chain loops comprising block links pivotally interconnected by connecting links for articulation about pivot pins. The chains are trained to travel around chain sprockets carried by cross shafts at each end of the tank. Elongated collector flights to extend transversely across the tank and their opposite ends are connected to the chains. The links in the chain on which the collector flights are mounted are referred to as flight attachment links. One of the cross shafts of the collector apparatus is driven causing the pair of chain loops to simultaneously revolve thus moving the chains along a straight line of travel to carry the flights mounted on the flight attachment links along the bottom of the tank and then along the surface of the water to move sludge and floating scum into collection areas. A collector apparatus of this type is shown in U.S. Pat. No. 3,313,422 issued Apr. 11, 1967 to W. R. Swenson.

In such prior art arrangements each flight attachment link includes a flight attachment support. When initially installed the flight attachment links on each of the spaced parallel chain loops are precisely aligned transversely in opposed relation which automatically aligns their associated flight supports. The collector flights are then secured to the transversely aligned supports. As previously mentioned these tanks can be over 20 feet wide and the flights are of a length that they span the full width of the tank.

In operation, the flights may bow under the loading force imposed by the weight of the material being moved. This bowing of the flights can apply a torsional stress to the flight supports and their associated attachment links which may result in premature failure thereof. The chains can also misindex on the sprockets. When chain misindexing occurs the flight attachment links are no longer transversely aligned, but remain interconnected by the transverse collector flights which impose forces tending to twist the attachment links. This places stress on the flight attachment links and flight supports.

One common way of dealing with such torsional stress was to reinforce all portions of the flight attachment links and flight supports to make them as strong and rigid as possible. This requires that the flight attachment link and paddle plate be of a reinforced heavy duty rigid construction which increases the cost of the chain manufacture, its weight and the power required to drive the chain. It has also been suggested in U.S. Pat. No. 5,165,522 issued Nov. 24, 1992 to Uttke et al. to design the flight attachment link and flight support to have significant torsional flexibility. A flexible link and flight support provides excellent service but requires a complex flight attachment link design and configuration which increases the cost of manufacture.

SUMMARY OF THE INVENTION

The present invention provides a chain having novel flight attachment links that can automatically self align their orientation relative to the chain line of travel in response to flight induced load forces and thereby avoid being subjected to potentially destructive torsional induced forces in a simple rugged low cost manner.

The chain embodying the invention includes block links and connecting links pivotally interconnected for articulation by pivot pins and further includes flight attachment links of special design that will allow the flight attachment links to individually cant relative to the line of chain travel for automatic self alignment in response to forces imposed by the flights secured to the flight supports.

More specifically the chain comprises a plurality of block links each of which includes longitudinally spaced apart ends with each end having a transverse pivot pin receiving first bore therethrough of a first diameter. The chain also includes a plurality of connecting links each having longitudinally spaced transverse pivot pins mounted in the block link first bores for articulatively interconnecting the ends of adjacent block links. The pivot pins have a close tolerance fit in the first bores to form a chain that extends in a straight line of travel. The chain further includes at least one flight attachment link having a flight support and leading and trailing ends pivotally connected to adjacent connecting links in the chain. The leading and trailing ends each have a second pivot pin receiving bore of a second diameter that is sufficiently larger than the pivot pin on which it is mounted to allow only the flight attachment link to cant relative to the straight line of travel of the chain for automatic self alignment in response to torsional stress that is imposed by the flight on the flight support link.

DESCRIPTION OF THE DRAWINGS

FIG. 1 is a sectional view of a liquid treatment tank having a collection apparatus utilizing chains having flight attachment links constructive according to the present invention.

FIG. 2 is an enlarged top elevational view, partially in section, of a portion of a chain shown in FIG. 1 showing one flight attachment link with its collector flight removed.

FIG. 3 is an enlarged side view of the chain and flight attachment link shown in FIG. 2.

FIG. 4 is a cross sectional view taken along line 4—4 of FIG. 2.

FIG. 5 is a diagrammatic top view of a horizontal run of the collection apparatus chains showing the flight attachment link and flights in a normal operative position.

FIG. 6 is a diagrammatic top view of a horizontal run of the collection apparatus chains similar to FIG. 5 showing misindexing of one of the chains and the automatic self alignment of the collector flight support links to relieve torsional stress.

FIG. 7 is a diagrammatic top view of a horizontal run of the collection apparatus chains similar to FIGS. 5 and 6 showing the opposed flight attachment links in canted positions of self alignment to relieve torsional stress caused by bowing of the flight due to the weight of the sludge being moved by the flight during operation.

DESCRIPTION OF THE PREFERRED EMBODIMENT

FIG. 1 shows a liquid treatment apparatus 10 which functions to remove waste material such as settled solids or sludge and floatable waste or scum from a waste liquid such as wastewater in a sewerage treatment plant or refinery. The wastewater treatment apparatus 10 includes a primary tank 12, having a bottom 14, a pair of opposed spaced apart sidewalls, 16 only one of which is shown in FIG. 1, an inlet end wall 18, and an outlet end wall 20. An inlet conduit 22 extends through the inlet end wall 18 for delivering wastewater into the tank 12. A baffle 24 extends across the tank 12 between the sidewalls 16 at a position spaced downstream of the inlet conduit 22. Adjacent the outlet end wall 20 is a box weir 26 which provides a transverse channel for the flow of wastewater out of the tank 12. A second baffle 28 extends across the tank 12 upstream of the outlet end wall 20 to prevent floating waste from flowing into the weir 26. The tank 12 is also provided with a scum collection trough 30 positioned upstream of the second baffle 28 for discharge of floating material from the tank and a sludge collection trough 32 adjacent the inlet end wall 18 for removal of sludge waste from the tank 12.

Referring to FIGS. 1-5 the wastewater treatment apparatus 10 also includes a sludge and scum collector apparatus 34 supported in the tank for moving floating waste to the collection trough 30 and settled waste to the sludge collection trough 32. The collector apparatus 34 includes a pair of endless chains 36, 37 that are trained around four pairs of toothed sprockets 38, 40, 42 and 44 which engage and drive the chains in a straight line of travel, at the top of the tank 12, and at the bottom of the tank 12, as indicated by arrow 46 in FIGS. 2 and 5. Each pair of sprockets 38, 40, 42 and 44 is mounted on one of the four transversely extending shafts 48 rotatably mounted in suitable bearings, not shown, secured in sidewalls 16 of the tank 12. The shaft 48 for sprockets 38 is a driven shaft and is rotated by a prime mover 54 mounted on a platform 56 above tank 12 for rotating the chains 36, 37 in a clockwise direction within the tank 12. In the upper run of chains 36, 37, they are supported against sagging by guide rails 39 (only one of which appears in FIG. 1) mounted on walls 16. The endless chains 36, 37 serve as carriers for a plurality of elongated transversely extending collector flights 58 which extend transversely between the chains 36, 37 at positions spaced along the straight line of chain travel 46.

As the endless chains 36, 37 are both identical in construction, only one of the chains 36 will be described with particular reference to FIGS. 2, 3 and 4. Chain 36 comprises a plurality of block links 60, connecting links 70 and flight attachment links 80. The block links 60 each include longitudinally spaced apart ends 62 and 63. Each of the ends 62 and 63 includes an integral spacer 64 having a pivot pin receiving first bore 66 of a first diameter. The block link 60 also has a center sprocket tooth receiving opening 68 which the teeth of sprockets 38-44 can enter to engage spacers 64 to drive the chain.

The chain connecting links 70 each include a pair of sidebars 71, 72 spaced apart a predetermined lateral dimension at their longitudinal ends 74 and, longitudinally spaced pivot pins 75 that are mounted in the block links first bores 66 for interconnecting the ends of adjacent block links 60. The connecting link sidebars 71, 72, are spaced apart a transverse width enabling the block links 60 to fit between them. Each of the sidebars 71, 72 has outer facing sides 73 at its longitudinally spaced apart ends 74 at which pivot pin receiving hubs 76 are located to provide a reinforced portion surrounding the pivot pins 75 mounted therein. Preferably the hubs 76 will each have diametrically extending slots 77 in their outer facing sides. In the illustrated arrangement the pivot pins 75 are each a hollow cylindrical member having axially extending tangs 78 which project beyond the hubs 76 when the pivot pin 75 is initially inserted through the bore in hub 76 and the first bores 66 of the block links 60. The tangs 78 are then bent over to fit into the outer hub slots 77 in order to nonrotatably retain each pin 75 in its finally installed position. The sidebars 71, 72 when installed lay transversely outside of the block links 60 and define a sprocket tooth receiving opening 79 therebetween.

Each of the chains 36, 37 in the chain and flight conveyor apparatus includes at least one and preferably a plurality of flight attachment links 80. The number of flight attachment links 80 on chain 36 corresponds to the number of flight attachment links 80 on chain 37 to permit them to be laterally opposed in transverse alignment when the chain loops are installed in tank 12. The flight attachment links 80 are identical in construction and therefore only one flight attachment link 80 will be described in detail.

Referring to FIGS. 2, 3, and 4 the flight attachment link 80 includes a base member 82 having longitudinally extending, upper and lower surfaces 84 and 85, leading and trailing ends 88 and 89, a flight attachment support 90, and a transversely extending second pivot pin receiving bore 92 in each of the leading and trailing ends 88, 89. The second pivot pin receiving bore 92 of the flight attachment link 80 permits the leading and trailing ends 88, 89 thereof to be pivotally connected to adjacent connecting links 70 of the chain in place of a block link 60. Each of the second pivot pin receiving bores 92 of the flight attachment link 80 are of a second diameter that is sufficiently larger than the pivot pin 75 on which it is mounted to allow only the flight attachment links 80 in their entirety to move or cant in the direction of arrows 91 in FIG. 2 with respect to the pivot pin therethrough and the adjacent link sidebars and relative to the straight line of travel 46 of the chain as illustrated in FIGS. 6 and 7 for automatic self alignment in a response to stress moments that are imposed on the flight attachment support 90 as will be more fully explained hereinafter. The flight attachment link leading and trailing ends 88 and 89 both have a lateral width which permits them to fit freely between the sidebars 71, 72 of the connecting links 70. In addition the leading and trailing ends 88, 89 are provided with laterally outward facing surfaces 93 each having bevels 94 and relieved areas 95 that define a generally convex area that will permit the flight attachment link 80 to cant as above described. The bevels 94 and relieved areas 95 provide increased clearance for the canting movement of the flight attachment link 80. While the provision of bevels 94 and relieved areas 95 are desirable they are not essential. In the alternative the width of the leading and trailing ends 88, 89 could be such that a space exists between surfaces 93 and the inside surface 87 of adjacent side bars 71, 72 with this space providing the clearance for canting movement. A space as described could also be used in combination with bevels 94 and relieved areas 95.

The flight attachment support 90 of each flight attachment link 80 includes a support plate 96 mounted on the base member 82 to project away from the upper surface 84 of the flight attachment link. The support plate 96 also extends transversely relative to the longitudinal extent of the base member 82 and includes cantilever portions 97 which project beyond each transverse side of the base member 82. Transverse brace elements 98 are connected between the base member lower surface 85 and the cantilevered portions 97 of the flight support plate 96. The flight support plate 96 further includes a sprocket tooth clearance opening 99 adjacent the center top surface area of the base member 82 and bolt receiving apertures 100 for mounting a flight 58 thereon.

Referring to FIG. 5 a chain and flight conveyor apparatus will include spaced parallel chain strands 36 and 37 having a corresponding number of opposed aligned flight attachment links 80 with only one pair of attachment links 80A, 80B being shown in FIG. 5. A collector flight 58 is mounted as by bolting to extend transversely between each pair of opposed flight attachment links 80A and 80B to extend at a right angle to the straight line of chain travel 46.

In the normal operating condition as shown in FIG. 5, the flight 58 will move a load of either suspended scum or settled sludge S under uniform loading conditions which places little or no torsional stress on the flight attachment links 80 and therefore their longitudinal extent will extend parallel to the straight line of travel 46.

However, as shown in FIG. 6 it is possible, for example after chain and gear tooth wear, for one of the chains 36 to misindex on any one of the geared sprockets 38–44 thus causing the opposed flight attachment links 80A, 80B to deviate from their normal transverse aligned right angle relationship to the straight line of travel 46. The larger second diameter of the second pivot pin receiving bores 92 of the flight attachment links 80 will allow the flight attachment links 80A, 80B to cant as shown in FIG. 6 relative to the straight line of travel 46 for automatic self alignment as necessary to eliminate the imposition of torsional stress on the flight attachment plate 96 and its associated flight attachment link 80.

Referring to FIG. 7, if the flights of the sludge and scum apparatus are unduly loaded they will bow as shown. Because of the larger second diameter of each second pin receiving bore 92 relative to the diameter of the pin 75 on which it is mounted the flight attachment links 80A and 80B are free to cant inwardly toward each other to accommodate the bowing of the flight 58 thus eliminating torsional loads which occur because of bowing of the flight.

We claim:

1. A chain and flight conveyor apparatus comprising:
a pair of spaced parallel chains each including a plurality of block links, each block link having spaced apart ends each of which has a bore therethrough of a first diameter; a plurality of connecting links, each connecting link having spaced apart ends each of which has a bore therethrough; at least one flight attachment link in each chain, each flight attachment link having a flight attachment support and longitudinally spaced leading and trailing ends each of which has a bore therethrough; and a plurality of pivot pins mounted in said bores in said block links, connecting links, and flight attachment links and articulatively joining connecting links with block links and flight attachment links to form said chain, said flight attachment links being pivotally connected between adjacent connecting links of said chain, said bores through each of said leading and trailing ends each having a second diameter sufficiently larger than the pivot pin on which it is mounted to allow said flight attachment link to cant relative to said straight line of travel for self alignment of said flight attachment link in response to force thereon, said bore through said leading end of said flight attachment link being separate from said bore through said trailing end of said flight attachment link, said second diameter being greater than said first diameter, and said spaced parallel chains being indexed to place said flight attachment links in one of said chains in laterally opposed relation to said flight attachment links in the other of said chains; and
a flight member connected to extend transversely between said transversely opposed flight attachment links of said spaced parallel chains.

2. The chain and flight conveyor apparatus according to claim 1 wherein said chain includes a plurality of flight attachment links spaced apart from each other along said straight line of travel by one or more intervening block and connecting links.

3. The chain and flight conveyor apparatus according to claim 1 wherein:
each of said connecting links includes sidebars spaced apart a predetermined lateral dimension with said pivot pins extending between said sidebars;
each of said flight attachment links being mounted on said pivot pins and having laterally outward facing surfaces at said leading and trailing ends in facing relation to said side bars; and
said outward facing surfaces each have a beveled area thereon to provide clearance for canting of said flight attachment link between said sidebars.

4. The chain and flight conveyor apparatus according to claim 3 wherein said outward facing surfaces have relieved areas therein intermediate said leading and trailing ends.

5. The chain and flight conveyor apparatus according to claim 1 wherein:
said flight attachment link includes a base member having a longitudinal extent and upper and lower surfaces; and
said flight attachment support includes a support plate mounted on said base member to project away from said upper surface, said support plate having cantilevered portions extending transversely between said base member and said support plate, and transverse brace elements connected between said base member lower surface and said cantilevered portions of said flight support plate.

6. The chain and flight conveyor apparatus according to claim 5 wherein said flight support plate has a drive tooth receiving opening adjacent said top surface of said base member.

7. A chain and flight conveyor apparatus comprising:
a pair of spaced parallel chains each including
a plurality of block links each having longitudinally spaced apart ends and a pivot pin receiving first bore through each of said ends of a first diameter, a plurality of connecting links each including longitudinally spaced pivot pins having a close tolerance pivotal fit in said first block link bores for articulatively interconnecting said block links and connecting links to form a chain extendable along a straight line of travel wherein said block links and connecting links cannot cant relative to each other; and a corresponding number of flight attachment links in each of said chains, each of said flight attachment links having a flight attachment support and leading and trailing ends pivotally mounted on predetermined ones of said pivot pins of adjacent connecting links in said chain, said leading and trailing ends each having a second pivot pin receiving bore of a second diameter sufficiently larger than the pivot pin on which it is mounted to allow only said flight attachment links to cant for self-adjustment relative to said straight line of travel to minimize torsional stress thereon during operation;

said spaced parallel chains indexed to place said flight attachment links in one of said chains in laterally opposed relation to said flight attachment links in the other of said chains; and a flight member connected to extend transversely between said transversely opposed flight attachment links of said spaced parallel chains.

8. The chain and flight conveyor apparatus according to claim 7 wherein:

each of said connecting links include sidebars spaced apart a predetermined lateral dimension;

each of said flight attachment links include laterally outward facing surfaces at said leading and trailing ends in opposed relation between said side bars; and said outward facing surfaces each have a beveled area thereon to provide clearance for canting of said flight attached link between said sidebars.

9. The chain and flight conveyor apparatus according to claim 8 wherein said outward facing surfaces have relieved areas therein intermediate said leading and trailing ends.

* * * * *